(12) United States Patent
Howland et al.

(10) Patent No.: US 7,793,299 B2
(45) Date of Patent: Sep. 7, 2010

(54) SYSTEM AND METHOD FOR SCHEDULING TASKS FOR EXECUTION

(75) Inventors: Melissa K. Howland, Endicott, NY (US); Michael J. Howland, Endicott, NY (US)

(73) Assignee: International Business Machines Corporation, Armonk, NY (US)

( * ) Notice: Subject to any disclaimer, the term of this patent is extended or adjusted under 35 U.S.C. 154(b) by 1408 days.

(21) Appl. No.: 11/214,604

(22) Filed: Aug. 30, 2005

(65) Prior Publication Data

US 2007/0050771 A1  Mar. 1, 2007

(51) Int. Cl.
G06F 9/46 (2006.01)
G06F 12/00 (2006.01)
(52) U.S. Cl. ..................... 718/108; 710/200
(58) Field of Classification Search ......... 718/104–105, 718/108; 710/200; 709/100
See application file for complete search history.

(56) References Cited

U.S. PATENT DOCUMENTS

| | | | | |
|---|---|---|---|---|
| 4,475,156 A * | 10/1984 | Federico et al. | ............. | 718/102 |
| 5,448,735 A * | 9/1995 | Anderson et al. | ........... | 718/100 |
| 5,455,951 A * | 10/1995 | Bolton et al. | ............... | 718/103 |
| 5,519,867 A * | 5/1996 | Moeller et al. | .............. | 718/107 |
| 5,729,710 A * | 3/1998 | Magee et al. | ............... | 711/203 |
| 5,745,778 A * | 4/1998 | Alfieri | ............................ | 712/1 |
| 5,961,584 A * | 10/1999 | Wolf | ........................... | 718/103 |
| 6,026,424 A * | 2/2000 | Circenis | ..................... | 718/104 |
| 6,029,205 A * | 2/2000 | Alferness et al. | ............ | 719/310 |
| 6,105,053 A * | 8/2000 | Kimmel et al. | ............. | 718/105 |
| 6,167,423 A | 12/2000 | Chopra et al. | | |
| 6,272,625 B1 * | 8/2001 | deCarmo | .................... | 712/245 |
| 6,289,369 B1 * | 9/2001 | Sundaresan | ................. | 718/103 |
| 6,304,891 B1 * | 10/2001 | Anderson et al. | ........... | 718/107 |
| 6,427,161 B1 * | 7/2002 | LiVecchi | .................... | 718/102 |
| 6,434,590 B1 * | 8/2002 | Blelloch et al. | ............. | 718/102 |
| 6,510,437 B1 * | 1/2003 | Bak et al. | ................. | 707/103 Y |
| 6,560,628 B1 * | 5/2003 | Murata | ........................ | 718/103 |
| 6,639,687 B1 * | 10/2003 | Neilsen | ..................... | 358/1.14 |
| 6,748,453 B2 * | 6/2004 | Law et al. | ................... | 719/314 |
| 6,823,515 B2 * | 11/2004 | LiVecchi | .................... | 718/105 |
| 6,842,898 B1 * | 1/2005 | Carlson et al. | ............. | 718/100 |
| 7,000,232 B2 * | 2/2006 | Jones et al. | ................ | 718/102 |
| 7,020,713 B1 * | 3/2006 | Shah et al. | .................. | 709/235 |
| 7,043,729 B2 * | 5/2006 | Lewis | ......................... | 718/103 |
| 7,155,724 B2 * | 12/2006 | Jones et al. | ................ | 718/107 |
| 7,207,042 B2 * | 4/2007 | Smith et al. | ................ | 718/104 |
| 7,360,218 B2 * | 4/2008 | Accapadi et al. | ............ | 718/102 |
| 7,389,507 B2 * | 6/2008 | Dickson | .................... | 718/102 |
| 7,395,536 B2 * | 7/2008 | Verbeke et al. | ............. | 718/100 |
| 7,472,237 B1 * | 12/2008 | Herbst et al. | ............. | 711/152 |
| 7,490,230 B2 * | 2/2009 | Jensen et al. | ................ | 712/245 |
| 2001/0034751 A1 * | 10/2001 | Eto et al. | ..................... | 709/100 |

(Continued)

*Primary Examiner*—Meng-Ai An
*Assistant Examiner*—Adam Lee
(74) *Attorney, Agent, or Firm*—Geraldine D. Monteleone

(57) ABSTRACT

A system for scheduling tasks for execution includes a queue of tasks ordered by scheduled time for execution. A timer thread monitors status of tasks in the queue and selectively dispatches tasks. A guard thread monitors status of tasks in the queue and selectively creates timer threads. The guard thread is responsive to a next task in the queue becoming ready for execution while a first timer thread is still processing a prior task to create a new timer thread to dispatch the next task and mark the first timer thread for closure. Thereafter, the first timer thread closes responsive to the prior task completing.

15 Claims, 7 Drawing Sheets

U.S. PATENT DOCUMENTS

| | | | |
|---|---|---|---|
| 2001/0042090 A1* | 11/2001 | Williams | 709/102 |
| 2002/0042807 A1* | 4/2002 | Thomas et al. | 709/1 |
| 2002/0120665 A1* | 8/2002 | Alford et al. | 709/107 |
| 2002/0133504 A1* | 9/2002 | Vlahos et al. | 707/104.1 |
| 2003/0037091 A1* | 2/2003 | Nishimura et al. | 709/103 |
| 2003/0088609 A1* | 5/2003 | Guedalia et al. | 709/107 |
| 2004/0054999 A1* | 3/2004 | Willen et al. | 718/103 |
| 2004/0103413 A1* | 5/2004 | Mandava et al. | 718/100 |
| 2004/0216108 A1* | 10/2004 | Robbin | 718/100 |
| 2005/0022186 A1* | 1/2005 | Accapadi et al. | 718/100 |
| 2005/0240934 A1* | 10/2005 | Patterson et al. | 718/105 |
| 2006/0044595 A1* | 3/2006 | Ferlitsch | 358/1.15 |
| 2006/0130062 A1* | 6/2006 | Burdick et al. | 718/100 |
| 2006/0271929 A1* | 11/2006 | Brack et al. | 718/1 |
| 2007/0008890 A1* | 1/2007 | Tseitlin et al. | 370/238 |
| 2008/0104600 A1* | 5/2008 | May | 718/103 |

* cited by examiner

SYSTEM AND METHOD FOR SCHEDULING TASKS FOR EXECUTION

BACKGROUND OF THE INVENTION

1. Technical Field of the Invention

This invention relates to computer applications. More particularly, it relates to a system and method for managing tasks in a queue of tasks scheduled for future execution.

2. Background Art

Computer applications often require the ability to schedule tasks for future execution. An example of such an application is the general timer support of the Hardware Management Console (HMC).

Referring to FIG. 1, typically tasks 122, 124, and 126 are queued and watched over, as is represented by line 148, by a thread of execution, referred to as a 'timer thread' 100. Timer thread 100 manages a queue, or list, 120 of tasks to be run ordered by 'next time to run' (with the nearest time to run being on top of list 120). When the closest task 122 is ready to run, timer thread 100 awakens and, as is represented by line 102, executes task 122. During this action (the running of the task) the remaining tasks 124, 126 waiting on queue 120 are not eligible to run. This is true even if the waiting tasks are currently ready or become ready to run while current task 122 is running. This is due to the fact that the timer thread 100 can only process a single task at a time. Upon completion of task 122, timer thread becomes available to execute, as is represented by line 104, the next task, in this case, task 124, when it is ready to run. A condition, referred to as 'starvation', occurs when task 124 becomes ready to run before task 122 completes.

In general, with timer thread N (100) currently running task N (122) and task N+1 (124) becomes ready to run, because task N 122 is not yet available (has not yet released timer thread N 100), task N+1 (124) will starve until a thread N+1 is created, or becomes available, to handle it. (In this example, timer thread 100 functions as thread N and as thread N+1.)

SUMMARY OF THE INVENTION

A system, method, and computer program product for scheduling tasks for execution by ordering tasks in a queue; providing a timer thread for monitoring status of tasks in the queue and for selectively dispatching tasks; providing a guard thread for monitoring status of tasks in the queue and for selectively creating timer threads; operating the guard thread responsive to a next task in the queue becoming ready for execution while a first timer thread is still processing a prior task to open a new timer thread for dispatching the next task and marking the first timer thread for closure; and responsive to the prior task completing, closing the first timer thread.

Other features and advantages of this invention will become apparent from the following detailed description of the presently preferred embodiment of the invention, taken in conjunction with the accompanying drawings.

DETAILED DESCRIPTION OF THE BEST MODE

In accordance with the present invention, the starvation problem is ameliorated by managing the creation of timer threads.

As used herein, 'thread' refers to a 'thread of execution', which is a single sequential flow of execution within a program. 'Timer thread', in this context, is the thread of execution currently responsible for the management of the queue of tasks. 'Task' is a unit of work that is scheduled for future execution. It comprises a series of program instructions that are to be executed on a thread when the scheduled time arrives. Tasks can be repeating (that is, they can execute multiple times) or they can be 'execute once'. 'Dispatch' means to cause to execute. In this context this term is used to describe the case where a timer thread calls a task that needs to be executed. This action essentially turns over control of the timer thread to the task and allows the code defined within the task to be run on the timer thread.

Figure 1:
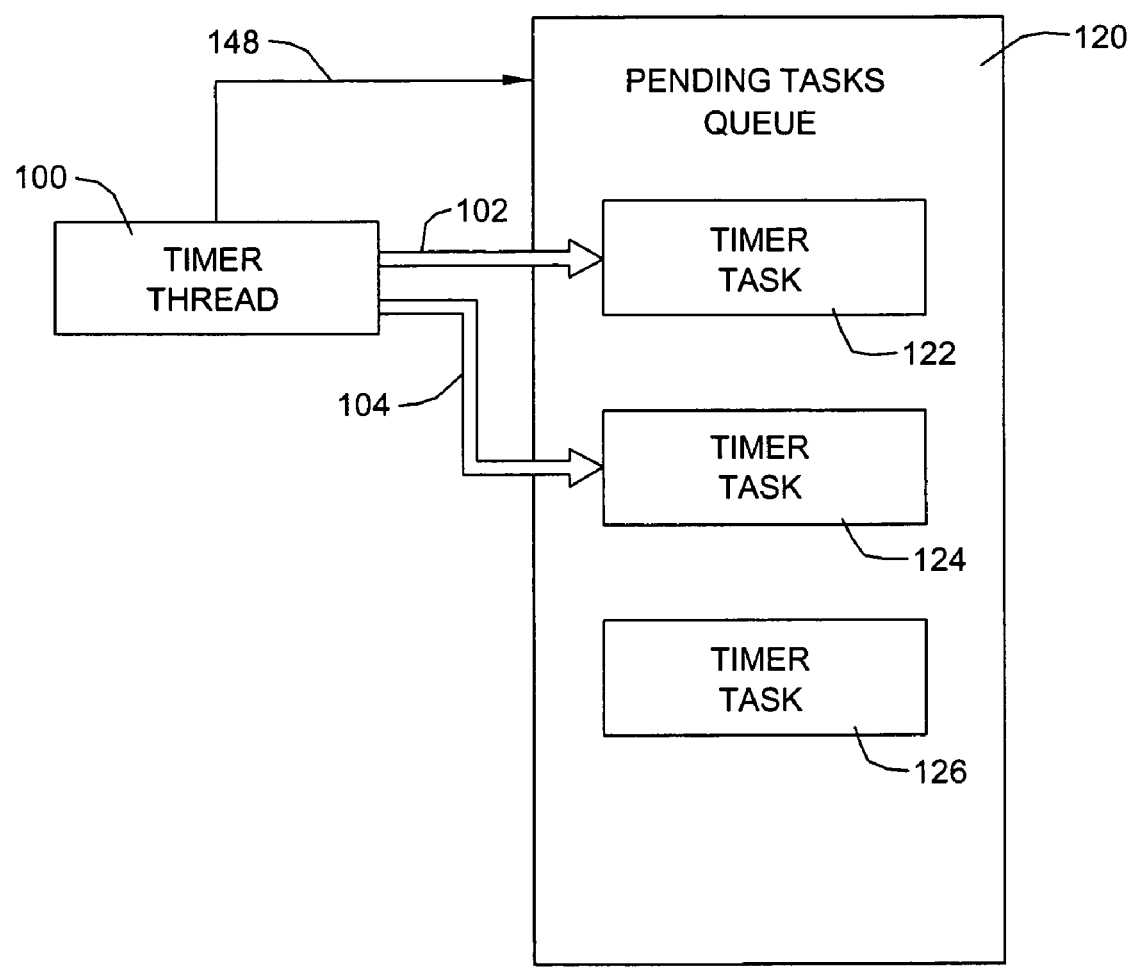
FIG. 1 is a diagrammatic representation of the prior art.

Referring further to FIG. 1, one approach for circumventing task starvation is to use several or many timer threads 100, all managing different queues 120 of waiting tasks 124, 126. This approach, however, has several adverse consequences. Since several queues 120 are being monitored, multiple timer threads 100 must exist (one per queue 120 being watched). An extreme case would allow a timer thread 100 for each task 122, 124, 126 that is scheduled. Because of the extra system resources these timer threads require, the solution is not optimal. In addition, although using multiple queues 120 may have reduced the exposure to starvation, the original starvation problem still persists for any individual queue 120 containing a plurality of tasks 122, 124, 126.

Another approach for circumventing task starvation is to have a single timer thread 100, but always to launch tasks 122, 124, 126 on their own threads when they need to run (perhaps obtaining these worker threads from a pool of dispatchable worker threads (not shown). This prevents the problem of starvation but can result in the creation of tasks threads 100 when they are not necessary, or requires that a thread pool (not shown) exist with idle worker threads ready for dispatching. Neither of these solutions is optimal.

Figure 2:
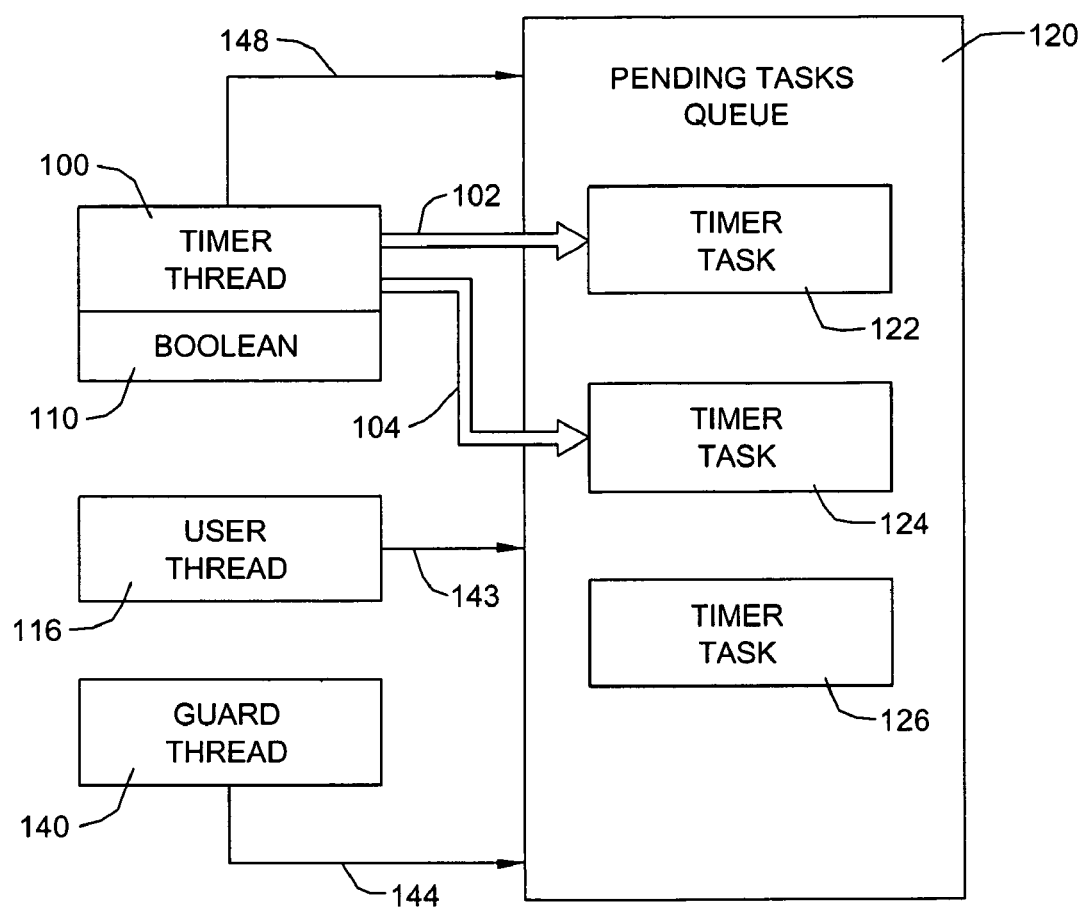
FIG. 2 is a diagrammatic representation of a preferred embodiment of the invention, illustrating execution of sequential tasks by a timer thread.
Figure 3:
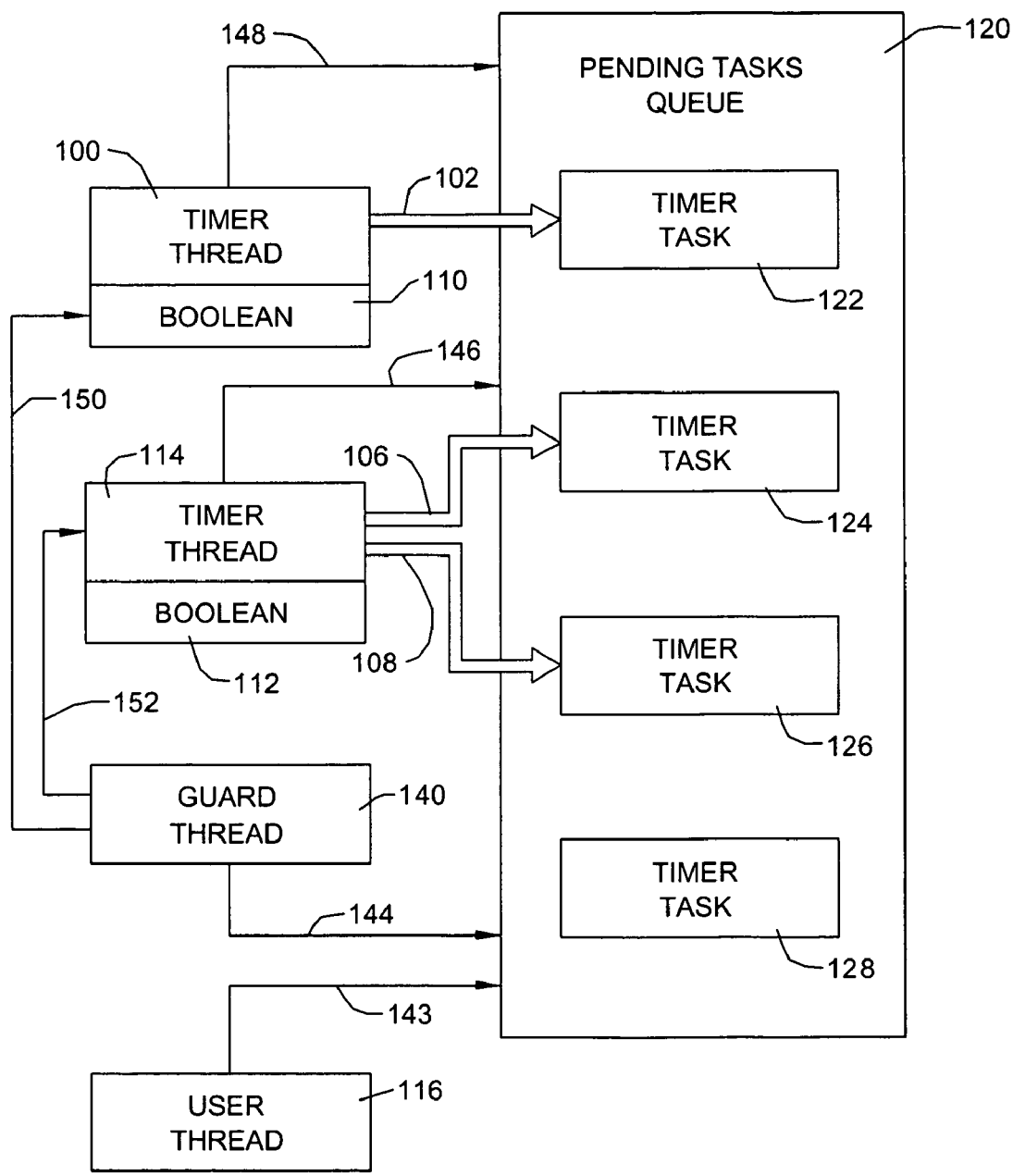
FIG. 3 is a diagrammatic representation of the preferred embodiment of FIG. 2, illustrating creation of a new timer thread for execution of tasks becoming ready to run prior to completion of a previous task.

Referring to FIGS. 2 and 3, it is observed that under many circumstances there is no need for a new thread 114 to be obtained. The only circumstance where a new thread 114 is required is if primary timer thread 100 is busy processing the 'current' task 122 and a new task 124 becomes ready for dispatching. In this case, and only in this case alone, is it necessary to obtain a new thread 114 to process the new task 124 and prevent it from being dispatched late (that is, to experience 'starvation').

In accordance with the preferred embodiments of the present invention, three elements are provided for ameliorating task starvation: timer threads 100, 114, queue 120 of tasks 122, 124, 126 waiting to run, and guard thread 140.

Referring to FIG. 2, as is represented by line 148, timer thread 100 watches queue 120 of tasks 122, 124, 126. When one of these tasks 122 is ready, timer thread 100 calls the ready task to process, as is represented by line 102; that is, timer thread 100 dispatches task 122. Once task 122 completes, if timer thread 100 is still serving as the timer thread, timer thread again waits on queue 120 of elements waiting for the next one (task 124) to be ready to run, at which time, as is represented by line 104, timer thread 100 dispatches task 124. However, timer thread 100 ends should it not be considered the timer thread after execution of task 122 completes.

Queue 120 of tasks 122, 124, 126 waiting to run is a queue data structure of tasks ordered by 'next to run' time. Tasks 122, 124, and 126 are placed on this queue 120 when scheduled for execution. Queue 120 is visible to both timer thread 100 and guard thread 140, and thus is the common object used for signaling purposes between current timer thread 100 and guard thread 140. Both timer thread 100 and guard thread 140 act to reschedule tasks that are already on queue 120, as is represented by lines 148 and 144, and other threads, such as user thread 116, are responsible for scheduling new tasks, as is represented by line 143.

Tasks 122, 124, 126 are shown in the Figures as residing in queue 120. Typically, task code is code that some user 116 has registered for execution. It is required to meet some interface requirements defined by the framework (for instance, it has a 'run( )' method where the user actually puts the code). In accordance with a preferred embodiment of the invention, queue 120 is a binary heap which is ordered on 'next execution'. The binary heap data structure is a well known structure that has an extremely fast access time for the lowest element and a very good insertion time (important when things are rescheduled). In the present application, it is referred to generically as a queue.

Referring to FIG. 3, guard thread 140, as is represented by line 144, watches queue 120 of task elements if, and only if, timer thread 100 is currently busy processing a task 122. Should a second task 124 become ready to run while current timer thread 100 is busy, as is represented by line 102, with a task, guard thread 140 replaces timer thread 100 with a new thread 114 and lets it dispatch, as is represented by line 106, to the newly ready task 124. As is represented by line 150, a boolean value 110 is reset in original timer thread 100, which now characterizes timer thread 100 as a previous timer thread. As is represented by line 102, previous timer thread 100 continues its processing of the original task 122 until it completes, whereupon previous timer thread 100 ends. As is represented by line 146, timer thread 114 is now monitoring tasks queue 120, and will, as is represented by line 108, dispatch task 126, provided such becomes ready to run subsequent to completion of task 124. Were task 126 to become ready to run prior to completion of task 124, then guard thread 140 would reset boolean value 112 in timer thread 114, and create a new timer thread (not shown) to dispatch task 126; timer thread 114 would, upon these conditions (boolean 112 being reset), terminate upon completion of task 124.

Lines 146 and 148 represent situations where rescheduling of tasks takes place. The act of rescheduling 146, 148 or queuing 143 is represented as actions on queue 120. Dispatching as represented by lines 102, 106, and 108, is shown logically accessing tasks 122, 124, 126 respectively within queue 120; however, queue 120 is a binary heap which in effect points to task code residing outside of queue 120, and that is the code which is executed on respective threads 100 and 114 as represented by lines 102, 106 and 108.

By comparing FIGS. 2 and 3, in the above manner, the creation of a new timer thread 114 to handle a new task 124 only occurs if absolutely necessary (the FIG. 3 scenario), and the typical necessity of having idle worker threads in a pool is avoided.

Should guard thread 140 take action to replace the timer thread 100, the newly created timer thread 114 takes over timer thread operations when it is done with its task 124.

In this manner, creation and associated context switching to a new thread 100 is being avoided under many, if not most, circumstances. Context switching is a general term that describes the work done by the operating system when creating and starting to run a new thread 114. One aspect of the present invention is that it avoids this operating system overhead unless it is absolutely required. A context switch to a new thread 114 to service a task 124 occurs only when absolutely required. Under most circumstances, the FIG. 2 scenario, a single timer thread 100 processes each task 122, 124, 126 in queue 120 as it becomes ready to run. It is only in situations where the 'next' task 124 to run would be dispatched late because the timer thread 100 is busy with a previous task 122 that guard thread 140 takes action to obtain or otherwise instantiate a new thread 114.

In cases where a conflict (late scheduling of a second task 124) does not occur, no extra threads 114 are created and no thread context switch takes place. All work associated with the dispatching of tasks and management of queue 120 occurs on the single timer thread 100 as long as no starvation occurs. Only when another task is ready to run and begins to starve does some action need to be taken.

If guard thread 140 determines that action needs to be taken, a new thread 114 is instantiated (created or, alternatively, obtained from a pool (not shown)) and assigned the role of 'timer thread' 114, taking over from timer thread 100 all timer thread responsibilities from that point forward (until it is replaced by having its boolean 112 reset, as described above upon guard thread 140 detecting a pending task is ready to execute while the timer thread is still executing a previously dispatched task.

Figure 4A:
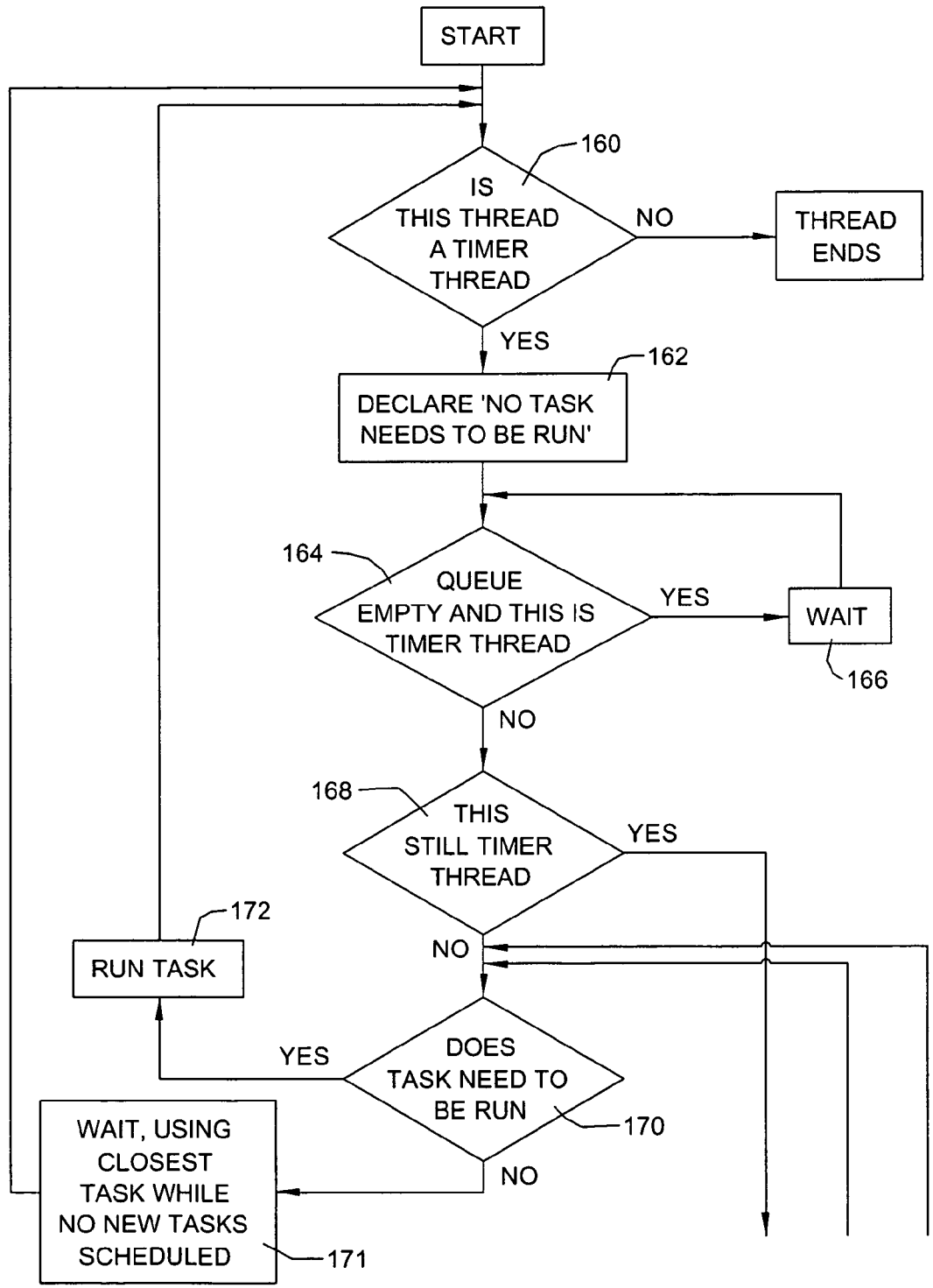
FIGS. 4A and 4B are a flow chart representation of the method executed by a timer thread in accordance with a preferred embodiment of the invention.
Figure 4B:
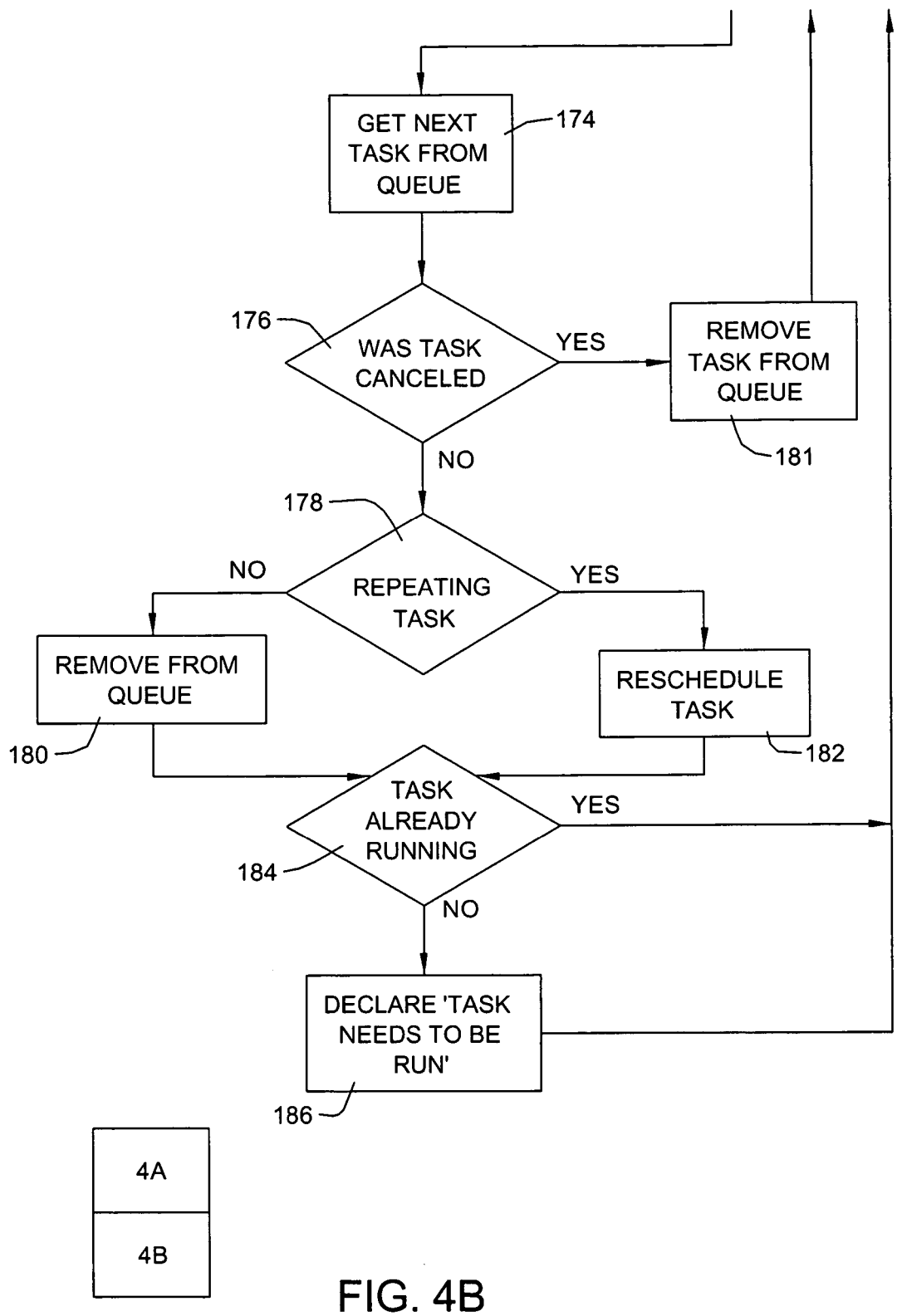

Referring to FIGS. 4A and 4B, operation of timer thread 100 begins with step 160 determining if this thread 100 is a timer thread. It is, provided it is a timer thread with boolean 110 set (that is, has not been reset by guard thread 140). If boolean 110 has been reset, this thread 100 is not a current timer thread, and it ends (either is discarded, or is returned to a pool of unused timer threads, not shown).

In step 162, if this thread 100 is a timer thread, then a 'no task needs to be run' declaration is set. The algorithm of FIGS. 4A and 4B uses a predicate loop to determine if a task needs to be executed. If one needs to be executed, this is indicated by assigning it to a variable. This variable is also set to 'null' to indicate that 'no task needs to be run' which instructs the timer thread to reenter its predicate loop. One reason it may fall through the loop without something to execute is to handle tasks that were canceled. If they are canceled they remain in the queue 120 of items to be run (to save processing time) but when their scheduled time arrives they are discarded and the predicate loop is reentered allowing the timer thread to wait for another task to become ready to run.

In step 164, if queue 120 is empty and thread 100 is a timer thread (boolean 110 set), then in step 166 processing waits until one of the conditions of query 164 fails.

Upon a condition in query 164 failing, step 168 determines if thread 100 is still a timer thread. If not, step 170 determines if a task has been established as a candidate for execution and, if so, in step 172 runs that task to completion and returns to step 160 where it will be determined that task 100 is no longer a task and will end.

Step 171, on the NO output of step 170 waits, using the closest task scheduled item as an end point. Upon awakening from this wait, it returns to step 160. When exiting from the NO leg of step 170, the top most task in the queue (the one that needs to run next) is not quite ready to run and doesn't want to run for a specific amount of time. Consequently, the thread waits using the value obtained from the 'next' task itself. Since this top task is the one that must surely run next (since the queue is an ordered queue) there is no need to do any other work until this time arrives. Of course, if a new task is scheduled while the wait is occurring, this is all reevaluated by abandoning the wait and proceeding to step 160.

If step 168 determines that thread 100 is still a timer thread (guard thread 140 has not reset its boolean 110), then step 174 gets next task 124 from queue 120.

Step 176 determines if next task 124 has been canceled and, if so, step 181 removes it from queue 120 and returns to step 170.

Step 178 determines if next task 124 is a repeating task. If so, step 182 reschedules task 124 and, if not, step 180 removes it from queue 120 preparatory to being dispatched by a timer thread 100). A repeating, existing task is asked to reschedule itself, which causes it to recalculate the next time it should run, whereupon it is moved to the appropriate location in the queue (with respect to the other waiting tasks, thus, the queue order is maintained). Guard thread 144 contains logic that prevents it from executing any active task. Should the guard thread detect this situation (that is, the 'next' task is already active), it reschedules it, causing it to move down the queue.

When a 'run once' task is dispatched, it is removed from queue 120. If it is a 'multi run' task, it is rescheduled (causing it to move down the queue).

In either event, step 184 determines if task 124 is already running and, if not, step 186 sets a 'task needs to be run' declaration. The 'yes' leg from step 184, and step 186, both return to step 170.

Figure 5:
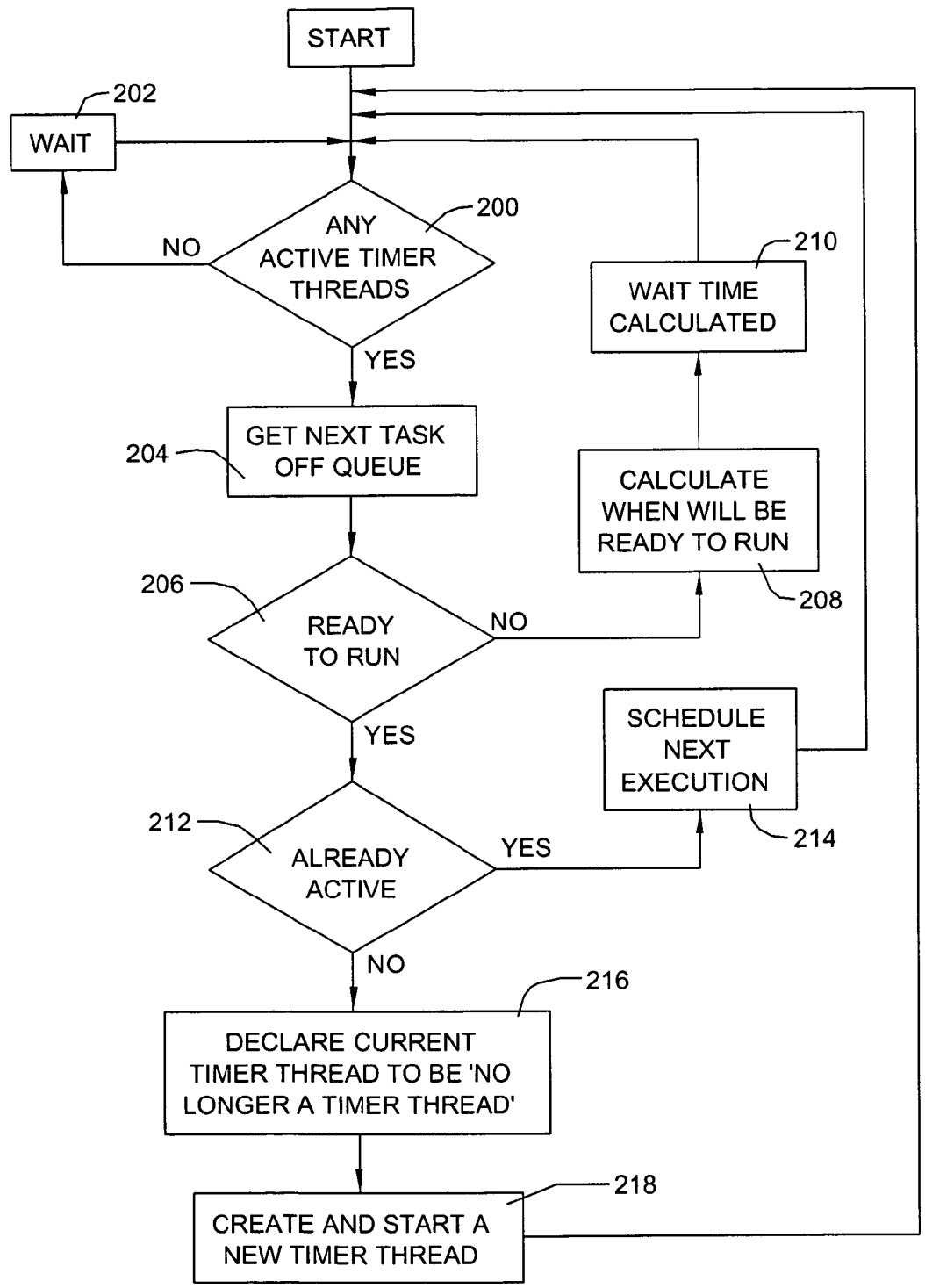
FIG. 5 is a flow chart representation of the method executed by a guard thread in accordance with a preferred embodiment of the invention.

Referring to FIG. 5, operation of a guard thread 140 begins in step 200 by determining if any active timer thread 100 exists. If not, step 202 waits. If there is an active timer thread (an active timer thread is one which has its boolean 110 set and which has dispatched a task 122 that has not yet completed), step 204 gets the next task 124 off queue 120, and step 206 determines if it is ready to run. If not, step 208 calculates when task 124 will be ready to run, and step 210 waits for the calculated time and then goes to step 200, above.

Step 212 determines if a task 206 which is ready to run is already active, and if so, step 214 schedules next execution and returns to step 200. 'Already active' implies that a timer thread (either the current or a previous timer thread) is actively running the task when it is examined. The fact that it was or was not previously run is not considered. Since guard thread 140 has encountered an 'active' task in the queue, this implies that the task must be a 'repeating task' (since 'run once' tasks are removed prior to execution). A repeating task that executes longer than its scheduled interval 'misses a turn' and is just rescheduled.

If step 212 determines that task 124 is already active, then step 216 declares the current timer thread 100 is no longer a timer thread (that is, guard thread 140 will reset boolean 110), and step 218 creates and starts a new timer thread 114.

Table 1 is a pseudo Java code representation of the operation of timer thread 100, annotated for correspondence to FIGS. 4A and 4B. Table 2 is a pseudo Java code representation of the operation of guard thread 140, annotated for correspondence to FIG. 5.

TABLE 1

TIMER THREAD 100

```
//Step 160, yes
while ( !terminated && this is the timer thread ) {
    taskToRun = null;              //Step 162
    synchronized ( queue ) {       //Synchronize access to
                                    queue.
                                    //The queue is also the
                                    //signaling mechanism between
                                    //the guard thread and the
                                    //timer thread.
    // Step 164, yes
    while (queue is empty && !terminated && this is the timer
            thread ) {
        // Step 166
        wait for signals (notifies) to the queue
    }
            // Step 168, yes
            if ( !terminated && this is the timer thread ) {
                // Step 174
                pTask = get next from queue;
                // Step 176, yes
                if ( pTask.canceled ) {
                    //Cancels are processed by marking the task as
                    //canceled.. it is left to bubble to the top as
                    //the ordered heap is consumed.... this is where
                    //it is consumed.
                    // Step 181
                    remove pTask from the queue
                } else {
                    // Step 170
                    // Can we run yet?
                    if ( pTask's nextExecutionTime <= currentTime ) {
                        // Yes, we can run
                        // Steps 180, 182
                        // Reschedule or remove task depending on what
                        // type it is.
                        // Step 178, no.   Step 180.
                        if ( pTask.period == 0 ) {      // One time task
                            remove pTask from the queue;
                        // Step 178, yes.   Step 182.
                        } else {                         // Repeating task
                            reschedule pTask relative to currentTime;
                        }
                        // Step 184, no.
                        // Can we run it?   It may already be running...
                        if ( pTask is not active ) {
                            // Step 170, yes.
                            taskToRun = pTask;
                            notify queue listeners;     // Awaken Guard
                                                         // thread
                        } else {
                            // Step 170, no.
                            // Can't run.   Wait letting the next task
                            // determine how long.
                            wait for ( pTask's nextExecutionTime ) –
                                currentTime mseconds;
                        }
                    }
                }
            }
    }
    // Step 170 ?? Step 184 no, step 186
    // If we have a task that needs running
    if ( taskToRun != null ) {
    // Step 172
        call taskToRun;                   // Invoke task
        // We're back... no clean up.
        synchronized( queue ) {           // Synchronize access to
                                           // queue
            runningTask = null;
            notify queue listeners;
        }
    }
}
```

TABLE 2

GUARD THREAD 140

```
while ( !terminated ) {
    synchronized( queue ) {
        // We only become active if there's a running task and
        // we haven't been terminated or exceeded a thread
        // count limit
        while ( ( ( active timers >= TIMER_THREAD_LIMIT || no
                tasks are running ) && !terminated ) {
            // Step 202
            wait for signals (notifies) to the queue
        }
        if (!terminated ) {
            // Step 204
            pTask = get next from queue;
            // Step 206
            if ( pTask.nextExecutionTime <= currentTime ) {
                // Step 212, yes.
                if ( pTask.active ) {
                    // Don't bother going further.   It is already
                    // being run.   Reschedule it and let the logic
                    // begin again.
                    // Step 214
                    queue.reschedule(pTask.reschedule(currentTime));
                    continue;
                }
                // top most task is starving
                // Step 212, no.
                // take control from the current timer thread,
                //     obtain new timer thread
                // Step 216
                timerThread.setTimerThread( false );       //Take control
                                                           // from
                                                           // current
                // Step 218
                timerThread = new thread            // Obtain new timer
                                                    // thread
                timerThread.start( );               // Start it running
            // Step 206, no.
            } else {
                // Nope, top task isn't ready to run.
                // Steps 208, 210.
                // We wait based on the execution time of the next
                //     task scheduled to run.
                Wait for (pTask's nextExecutionTimer) –
                    currentTime mseconds;
            }
        }
    }
}
```

Advantages over the Prior Art

It is an advantage of the present invention that there is provided an improved system and method for scheduling tasks on a minimum number of threads.

Alternative Embodiments

The invention can take the form of an entirely hardware embodiment, an entirely software embodiment or an embodiment containing both hardware and software elements. In a preferred embodiment, the invention is implemented in software, which includes but is not limited to firmware, resident software, microcode, etc.

Figure 6:
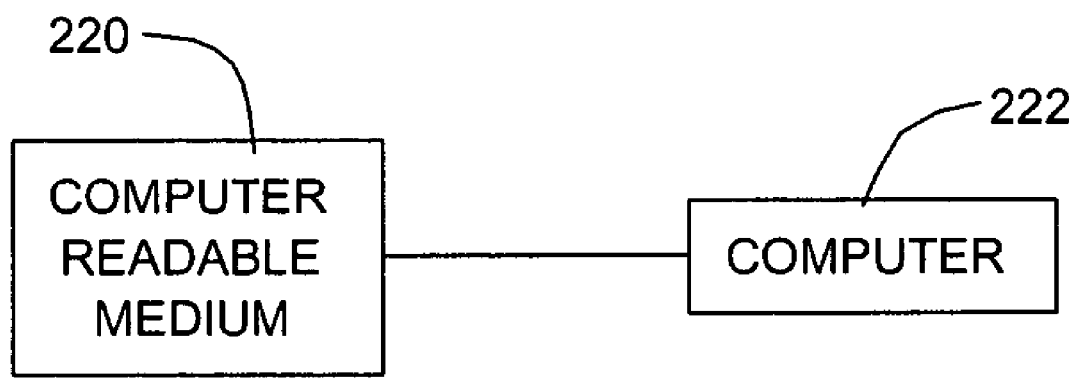
FIG. 6 is a high level diagram illustrating a computer and computer readable medium for storing and executing program instructions for carrying out the preferred embodiments of the invention.

Furthermore, referring to FIG. 6, the invention can take the form of a computer program product accessible from a computer-usable or computer-readable medium 220 providing program code for use by or in connection with a computer 222 or any instruction execution system. For the purposes of this description, a computer-usable or computer-readable medium 220 can be any apparatus that can contain, store, communicate, propagate, or transport the program for use by or in connection with the instruction execution, system, apparatus, or device 222.

The medium 220 can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk—read only memory (CD-ROM), compact disk—read/write (CD-R/W) and DVD.

A data processing system 222 suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modem and Ethernet cards are just a few of the currently available types of network adapters.

Accordingly, the scope of protection of this invention is limited only by the following claims and their equivalents.

We claim:

1. A method for scheduling tasks for execution, comprising:
    ordering by a computer processor tasks that are scheduled to execute at a scheduled time in a queue;
    providing by a computer processor a timer thread for monitoring status of tasks in said queue and for selectively dispatching tasks;
    providing by a computer processor a guard thread for monitoring status of tasks in said queue and for selectively creating timer threads;
    operating by a computer processor said guard thread responsive to a next task in said queue becoming ready for execution at a scheduled time while a first timer thread is still processing a prior task to create a new timer thread for dispatching said next task at the scheduled time and marking said first timer thread for closure;
    operating by a computer processor said guard thread for selectively setting and resetting a boolean value in timer threads, with said boolean value being set in a timer thread and said boolean value being reset to mark a prior timer thread for closure; and
    responsive to said prior task completing, closing by a computer processor said first timer thread,
    wherein the method being performed by a data processing system having at least one computer processor.

2. The method of claim 1, further comprising:
    responsive to said next task in said queue becoming ready for execution subsequent to said prior task completing, operating by a computer processor said first timer thread to dispatch said next task.

3. The method of claim 1, further comprising:
    operating by a computer processor said new timer thread to monitor status of tasks in said queue.

4. The method of claim 1, further comprising:
    operating by a computer processor said guard thread to monitor status of tasks in said queue only while said first timer thread is processing a task.

5. The method of claim 1, further comprising:
    operating by a computer processor a user thread to add tasks to said queue and said timer thread selectively to remove and reschedule tasks on said queue.

6. A system for scheduling tasks for execution, comprising:
    a computer processor coupled to a memory wherein the computer processor is programmed to perform:
        a queue of tasks ordered by scheduled time for execution;
        a timer thread for monitoring status of tasks in said queue and for selectively dispatching tasks according to the scheduled time for execution;
        a guard thread for monitoring status of tasks in said queue and for selectively creating timer threads;
        said guard thread responsive to a next task in said queue becoming ready for execution at a scheduled time while a first timer thread is still processing a prior task for creating a new timer thread to dispatch said next task at the scheduled time and for marking said first timer thread for closure;
        said guard thread selectively setting and resetting a boolean value in timer threads, with said boolean value being set in a timer thread and said boolean value being reset to mark a prior timer thread for closure; and
        said first timer thread closing responsive to said prior task completing.

7. The system of claim 6, further comprising:
    said first timer thread operating responsive to said next task in said queue becoming ready for execution subsequent to said prior task completing to dispatch said next task.

8. The system of claim 6, further comprising:
    said new timer thread monitoring status of tasks in said queue.

9. The system of claim 6, further comprising:
    said guard thread monitoring status of tasks in said queue only while said first timer thread is processing a task.

10. The system of claim 9, further comprising:
    a user thread for adding tasks on said queue, said timer thread further for selectively removing and rescheduling tasks on said queue.

11. A computer program product for scheduling tasks for execution, said computer program product comprising:
    a computer readable storage medium;
    first program instructions to order tasks in a queue that are scheduled to execute at a scheduled time;
    second program instructions to provide a timer thread for monitoring status of tasks in said queue and to selectively dispatch tasks;
    third program instructions to provide a guard thread for monitoring status of tasks in said queue and to selectively open timer threads;
    fourth program instructions to operate said guard thread responsive to a next task in said queue becoming ready for execution at a scheduled time while a first timer thread is still processing a prior task to create a new timer thread for dispatching said next task at the schedule time and to mark said first timer thread for closure;
    fifth program instructions to operate said guard task for selectively setting and resetting a boolean value in timer threads, with said boolean value being set in a timer thread and said boolean value being reset to mark a prior timer thread for closure;
    sixth program instructions responsive to said prior task completing, to close said first timer thread; and wherein
    said first, second, third, fourth, fifth and sixth program instructions are recorded on said computer readable storage medium.

12. The computer program product of claim 11, further comprising:
    seventh program instructions responsive to said next task in said queue becoming ready for execution subsequent to said prior task completing, to operate said first timer thread to dispatch said next task; and wherein
    said seventh program instructions are recorded on said computer readable storage medium.

13. The computer program product of claim 11, further comprising:
    seventh program instructions to operate said new timer thread to monitor status of tasks in said queue; and wherein said seventh program instructions are recorded on said computer readable storage medium.

14. The computer program product of claim 11, further comprising:

seventh program instructions to operate said guard thread to monitor status of tasks in said queue only while said first timer thread is processing a task; and wherein said seventh program instructions are recorded on said computer readable storage medium.

15. The computer program product of claim 11, further comprising:

seventh program instructions to operate a user thread to add tasks to said queue and said timer thread selectively to remove and reschedule tasks on said queue; and wherein said seventh program instructions are recorded on said computer readable storage medium.

* * * * *